US011489687B2

(12) United States Patent
Bhide et al.

(10) Patent No.: US 11,489,687 B2
(45) Date of Patent: Nov. 1, 2022

(54) OPTIMIZED ELECTRONIC CONFERENCE SYSTEM

(71) Applicant: International Business Machines Corporation, Armonk, NY (US)

(72) Inventors: Manish Anand Bhide, Hyderabad (IN); Phani Kumar V. U. Ayyagari, Hyderabad (IN); Madan K Chukka, Hyderabad (IN); PurnaChandra Rao Jasti, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/204,123

(22) Filed: Mar. 17, 2021

(65) Prior Publication Data
US 2022/0303151 A1  Sep. 22, 2022

(51) Int. Cl.
*H04L 12/18* (2006.01)
*G10L 15/18* (2013.01)
*G10L 15/26* (2006.01)

(52) U.S. Cl.
CPC ...... *H04L 12/1831* (2013.01); *G10L 15/1822* (2013.01); *G10L 15/26* (2013.01); *H04L 12/1822* (2013.01); *H04L 12/1827* (2013.01)

(58) Field of Classification Search
CPC ............ H04L 12/1831; H04L 12/1822; H04L 12/1827; G10L 15/1822; G10L 15/26
See application file for complete search history.

(56) References Cited

U.S. PATENT DOCUMENTS

| 7,308,476 | B2 | 12/2007 | Mannaru |
| 9,900,440 | B1* | 2/2018 | Patel ................. H04L 12/1822 |
| 11,128,483 | B1* | 9/2021 | Surazski ............ H04L 12/1822 |
| 2005/0233736 | A1 | 10/2005 | Berstis |
| 2009/0177743 | A1* | 7/2009 | Ashour ............... H04L 12/1831 709/204 |
| 2009/0319916 | A1* | 12/2009 | Gudipaty ............. H04L 65/403 715/753 |
| 2010/0150320 | A1* | 6/2010 | Lingafelt ................ H04M 3/56 379/68 |
| 2010/0316207 | A1* | 12/2010 | Brunson ................ H04M 3/56 379/202.01 |
| 2011/0113351 | A1 | 5/2011 | Phillips |
| 2012/0128322 | A1* | 5/2012 | Shaffer ............ G11B 20/10527 386/241 |

(Continued)

OTHER PUBLICATIONS

"Do I Get Dropped from the Audio Conference if I Disconnect from My Meeting?", Sep. 26, 2018, 2 pages, <https://help.webex.com/en-us/WBX81894/>.

(Continued)

*Primary Examiner* — Patrice L Winder
(74) *Attorney, Agent, or Firm* — Stephanie L. Carusillo

(57) ABSTRACT

A profile associated with a user that has unintentionally disconnected from an electronic conference is determined. Content missed by the user is determined. A determination is made whether the content missed by the user is relevant to the user based on the determined profile associated with the user and an indicated preference of the user. In response to determining that the content missed by the user is relevant to the user, the content missed by the user is transmitted to a computing device of the user.

18 Claims, 3 Drawing Sheets

(56) References Cited

U.S. PATENT DOCUMENTS

| | | | | |
|---|---|---|---|---|
| 2012/0275349 A1* | 11/2012 | Boyer | ............... | H04L 12/1822 |
| | | | | 370/261 |
| 2014/0108499 A1* | 4/2014 | Midtun | .............. | H04L 12/1827 |
| | | | | 709/203 |
| 2014/0362979 A1* | 12/2014 | Kaplan | ............... | H04M 3/568 |
| | | | | 379/67.1 |
| 2016/0021253 A1* | 1/2016 | Petit-Huguenin | ..... | H04L 65/403 |
| | | | | 370/260 |
| 2016/0057390 A1 | 2/2016 | Ramalho | | |
| 2016/0285929 A1* | 9/2016 | Oganezov | ............ | H04L 65/765 |
| 2016/0323333 A1* | 11/2016 | Aggarwal | .......... | H04L 65/4038 |
| 2018/0077099 A1* | 3/2018 | Silva | ...................... | H04L 51/16 |
| 2019/0228176 A1* | 7/2019 | Fishbeck | ................. | G06N 3/04 |

OTHER PUBLICATIONS

"What are conversational bots in Microsoft Teams?", Jan. 12, 2021, 6 pages, <https://docs.microsoft.com/en-us/microsoftteams/platform/bots/what-are-bots>.

"Your digital AI meeting assistant is arriving", Webex, © 2021, 7 pages, <https://www.webex.com/ai-assistant.html>.

"Patent Cooperation Treaty PCT International Search Report", Applicant's File Reference: P201910967, International Application No. PCT/EP2022/055059, International Filing Date: Mar. 1, 2022, dated Jun. 14, 2022, 12 pages.

* cited by examiner

OPTIMIZED ELECTRONIC CONFERENCE SYSTEM

BACKGROUND

The present invention relates generally to the field of electronic conferences (e-cons), and more particularly providing missed content to a user unintentionally disconnected from an e-con.

Electronic conferences, or e-cons for short, are popular tools for many businesses today. An e-con allows people to "meet" regardless of where they are located, within the same state, within the same country, or anywhere across the globe where Internet access is available. E-cons are used for both intracompany and intercompany communications. Any number of reasons exist for why an e-con is preferable to a face-to-face meeting—some examples include reducing travel expenses, meeting quickly to resolve a technical problem, and minimizing the spread of a virus during a health crisis. Users can connect to an e-con via various computing devices (e.g., desktop computers, laptop computers, tablet computers, and smartphones) using several networks (e.g., a hardwired connection, a Wi-Fi (wireless fidelity) connection, and a mobile network).

SUMMARY OF THE INVENTION

Embodiments of the present invention include an approach for providing missed content to a user unintentionally disconnected from an e-con. In one embodiment, a profile associated with a user that has unintentionally disconnected from an electronic conference is determined. Content missed by the user is determined. A determination is made whether the content missed by the user is relevant to the user based on the determined profile associated with the user and an indicated preference of the user. In response to determining that the content missed by the user is relevant to the user, the content missed by the user is transmitted to a computing device of the user.

DETAILED DESCRIPTION

Embodiments of the present invention recognize that we live in a connected world. Electronic conferences, or e-cons, allow people the ability to connect from wherever they are located in the world provided they have the necessary computing devices and access to an appropriate network. Many people find themselves using a popular e-con tool for keeping in touch (e.g., grandparents are able to virtually meet with their children and grandchildren and co-workers are able to enjoy virtual happy hours). Companies also provide e-con platforms for their workers; meeting virtually allow people to work from home and still carry out mission critical assignments.

Embodiments of the present invention recognize that there may be a method, computer program product, and computer system for providing missed content to a user unintentionally disconnected from an electronic conference. The method, computer program product, and computer system improve the technology of the e-con platform (i.e., software) by monitoring a connection of a user. Should a user unintentionally disconnect (i.e., drop) from the e-con, the method, computer program product, and computer system can capture the content within the e-con and provide it to the user upon the user's reconnection to the e-con.

In an embodiment, an indication of an e-con is received. In the embodiment, participants (both current and new) of the e-con are identified. Further in the embodiment, a determination is made whether the identified users (i.e., participants of the e-con) have opted-in. Further yet in the embodiment, a listen mode of the e-con is enabled. Further yet in the embodiment, a determination is made whether an opted-in user has unintentionally dropped from the e-con. Further yet in the embodiment, the dropped user is identified. Further yet in the embodiment, a determination is made whether the dropped user has reconnected to the e-con. Further yet in the embodiment, a determination is made whether the time duration of the drop has exceeded a threshold. Further yet in the embodiment, a profile of the dropped user is determined. Further yet in the embodiment, missed content associated with the dropped user is determined. Further yet in the embodiment, the missed content is transmitted to the user.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
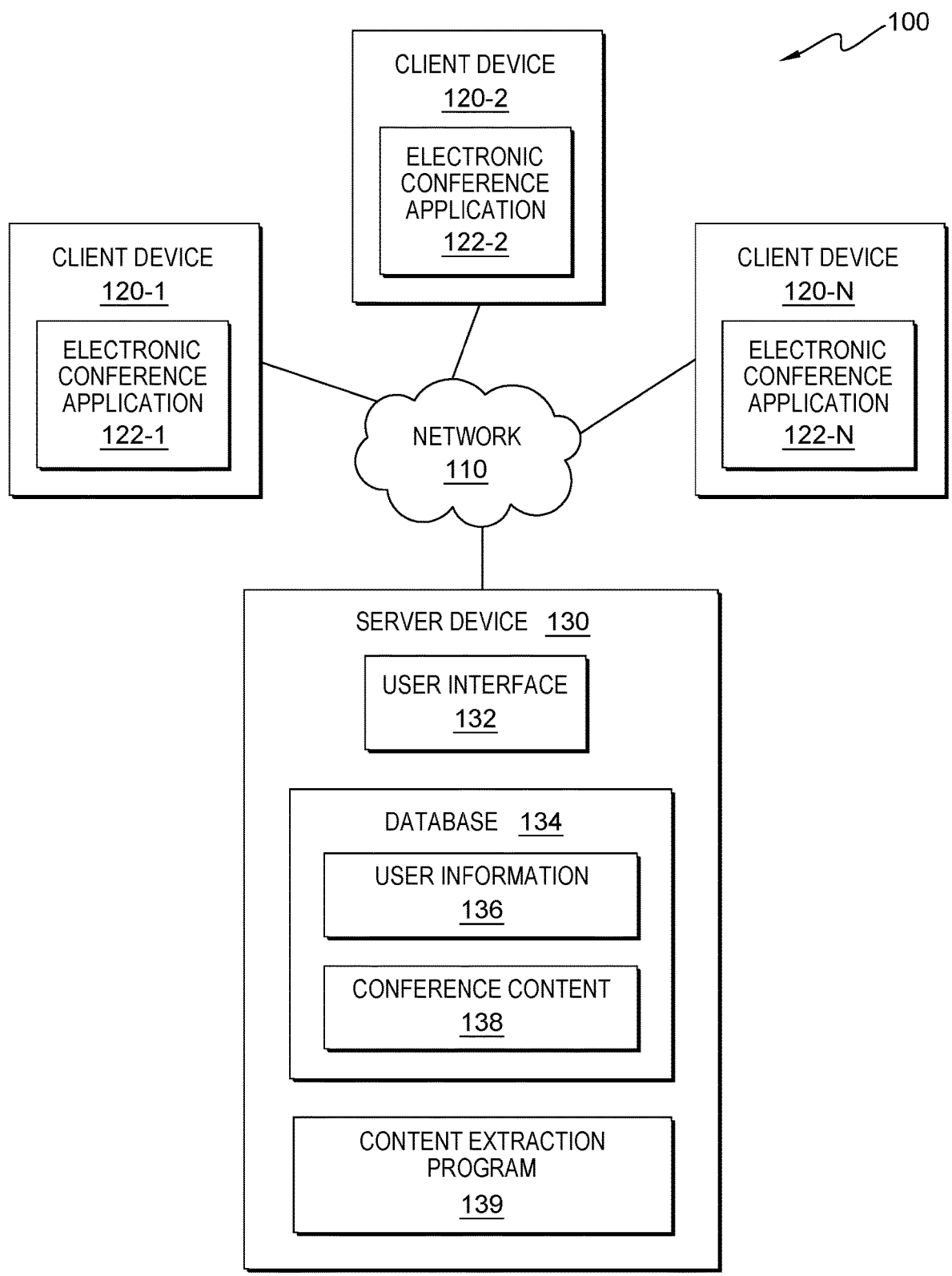
FIG. 1 depicts a functional block diagram illustrating a computing environment which includes a content extraction program, in accordance with an embodiment of the present invention.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client device 120-1, client device 120-2, client device 120-N, and server device 130 interconnected by network 110. In example embodiments, computing environment 100 includes other computing devices (not shown in FIG. 1) such as wearable technology, cell phones, smartphones, phablets, tablet computers, laptop computers, desktop computers, additional client devices, other computer servers, or any other computer system known in the art, interconnected with client device 120-1, client device 120-2, client device 120-N, and server device 130 over network 110. For ease of reading, client device 120-N will refer to any instance of client device 120-1, client device 120-2, and client device 120-N throughout this document.

In embodiments of the present invention, client device 120-N and server device 130 are connected to network 110, which enables client device 120-N and server device 130 to access other computing devices and/or data not directly stored on client device 120-N and server device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between client device 120-N and server device 130, and any other computing devices (not shown in FIG. 1) connected to network 110, in accordance with embodiments of the present invention.

According to an embodiment, client device 120-N may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client device 120-N can be a standalone computing device, a management server, a web server, a mobile computing device, or any other electronic device or computing system capable of receiving, transmitting, and processing data. In other embodiments, client device 120-N can represent computing systems utilizing multiple computers as a server system, such as in a cloud computing environment. In certain embodiments, client device 120-N represents a computer system utilizing clustered computers and components (e.g., database server computers, application server computers, etc.) that act as a single pool of seamless resources when accessed by elements of computing environment 100. In general, client device 120-N is representative of any electronic device or combination of electronic devices capable of executing computer readable program instructions. According to one embodiment, client device 120-N is a computing device used to connect to an electronic conference (i.e., e-con). In an embodiment, computing environment 100 includes any number of client device 120-N. Client device 120-N may include internal and external hardware components as depicted and described in further detail with respect to FIG. 3, in accordance with embodiments of the present invention. In an embodiment, client device 120-N includes electronic conference application 122-N (and accordingly client device 120-1 includes electronic conference application 122-1 and client device 120-2 includes electronic conference application 122-2).

In an embodiment, electronic conference application (e-con app) 122-N is a software application that allows two or more people to virtually meet and participate together on an assignment without being in the same location. The two or more people can be located anywhere, such as on two different floors in the same building or on two different continents on the planet. E-con app 122-N is installed on a computing device of a user (e.g., on a mobile device such as a smartphone or tablet computer, on a more traditional computing device such as a desktop or laptop computer, or on any other computing device known in the art that is compatible with electronic conferencing programs). E-con app 122-N can be used for both personal and business meetings and provides advantages over face-to-face meetings such as saving time and money for businesses by reducing travel and the associated expenses, increasing efficiency as a meeting can take place whenever it is convenient for the participants, and simplifying communication as electronic conferencing platforms, such as e-con app 122-N, are simple to use and allow people to meet even during a pandemic when people need to maintain social distance for safety considerations.

According to an embodiment, server device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 130 can be a standalone computing device, a management server, a web server, a mobile computing device, or any other electronic device or computing system capable of receiving, transmitting, and processing data. In other embodiments, server device 130 can represent computing systems utilizing multiple computers as a server system, such as in a cloud computing environment. In certain embodiments, server device 130 represents a computer system utilizing clustered computers and components (e.g., database server computers, application server computers, etc.) that act as a single pool of seamless resources when accessed by elements of computing environment 100. In general, server device 130 is representative of any electronic device or combination of electronic devices capable of executing computer readable program instructions. According to one embodiment, server device 130 is a data collection and processing device. In an embodiment, computing environment 100 includes any number of server device 130. Server device 130 may include internal and external hardware components as depicted and described in further detail with respect to FIG. 3, in accordance with embodiments of the present invention. In an embodiment, server device 130 also includes user interface (UI) 132, database 134, and content extraction program 139.

In an embodiment, UI 132 provides an interface between a user of server device 130, client device 120-N, and content extraction program 139. UI 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. UI 132 may also be mobile application software that provides an interface between server device 130, client device 120-N, and content extraction program 139. Mobile application software, or an "app," is a computer program designed to run on smartphones, tablet computers and other mobile devices. UI 132 enables a user of server device 130 to interact with network 110, client device 120-N, database 134, content extraction program 139, any other programs and applications included on server device 130 (not shown in FIG. 1), and any other computing devices (not shown in FIG. 1).

According to an embodiment, database 134 is storage that is written to and/or read by client device 120-N, e-con app 122-N, content extraction program 139, and any other programs and applications on client device 120-N and server device 130. In one embodiment, database 134 resides on server device 130. In other embodiments, database 134 resides on client device 120-N, on any other device (not shown in FIG. 1) in computing environment 100, in cloud storage, or on another computing device accessible via network 110. In yet another embodiment, database 134 represents multiple storage devices within server device 130. Database 134 may be implemented using any volatile or non-volatile storage media for storing information, as known in the art. For example, database 134 may be implemented with a tape library, optical library, one or more independent hard disk drives, multiple hard disk drives in a redundant array of independent disks (RAID), solid-state drives (SSD), or random-access memory (RAM). Similarly, database 134 may be implemented with any suitable storage architecture known in the art, such as a relational database, an object-oriented database, or one or more tables. In an embodiment of the present invention, client device 120-N, e-con app 122-N, content extraction program 139, and any other programs and applications (not shown in FIG. 1) operating on server device 130 may store, read, modify, or write data to database 134. In an embodiment, database 134 includes user information 136 and conference content 138.

According to an embodiment, user information 136 is information associated with the two or more participants of an electronic conference. Types of information stored to user information 136 includes, but is not limited to, names of users, contact information of users (e.g., e-mail addresses, cell phone numbers, and the like), job roles of users (e.g., title, department or organization name, organization structure, current responsibilities, and the like), and any other information associated with the work performed by the user. Sensitive personal information of users is not stored to user information 136 on server device 130.

In an embodiment, conference content 138 is information associated with an electronic conference. In the embodiment, conference content 138 includes both audio information and video (i.e., visual) information included in the e-con. In the embodiment, conference content 138 includes information associated with both a current, on-going e-con and one or more past e-cons that have been monitored by content extraction program 139.

According to an embodiment of the present invention, content extraction program 139 is a program, a subprogram of a larger program, an application, a plurality of applications, or mobile application software, which functions to provide missed content to a user unintentionally disconnected from an electronic conference. A program is a sequence of instructions written to perform a specific task. In an embodiment, content extraction program 139 runs independently. In other embodiments, content extraction program 139 depends on system software and/or other programs (not shown in FIG. 1) to execute. According to an embodiment, content extraction program 139 is a cognitive system based on artificial intelligence utilizing machine learning and deep learning which processes information from an on-going e-con. Content extraction program 139 processes the information using tools such as speech-to-text, text analytics, and natural language understanding. In one embodiment, content extraction program 139 functions as a stand-alone program residing on server device 130. In another embodiment, content extraction program 139 works in conjunction with other programs, applications, etc., found in computing environment 100. In yet another embodiment, content extraction program 139 resides on other computing devices such as client device 120-N in computing environment 100, which is interconnected to server device 130 via network 110.

According to an embodiment, content extraction program 139 receives an indication from at least one user of an electronic conference (e-con). In the embodiment, content extraction program 139 identifies two or more participants in the e-con and further, identifies any participants that join the e-con after the initial identification. Further in the embodiment, content extraction program 139 determines whether the identified participants have opted-in for granting content extraction program 139 permission to collect information associated with the identified users. Further yet in the embodiment, content extraction program 139 ignores participants who have not opted-in. Further yet in the embodiment, content extraction program 139 enables a listening mode. Further yet in the embodiment, content extraction program 139 determines whether a user has unintentionally disconnected from the e-con. Further yet in the embodiment, content extraction program 139 identifies the participant who has unintentionally disconnected. Further yet in the embodiment, content extraction program 139 determines whether the identified user has reconnected to the e-con. Further yet in the embodiment, content extraction program 139 determines whether the time to reconnect has exceeded a threshold. Further yet in the embodiment, in response to determining that the time to reconnect has not exceeded a threshold, content extraction program 139 determines the profile of the identified participant. Further yet in the embodiment, content extraction program 139 determines the content of the e-con that was missed by the identified participant while said user was disconnected. Further yet in the embodiment, content extraction program 139 transmits the missed content to the identified participant.

Figure 2:
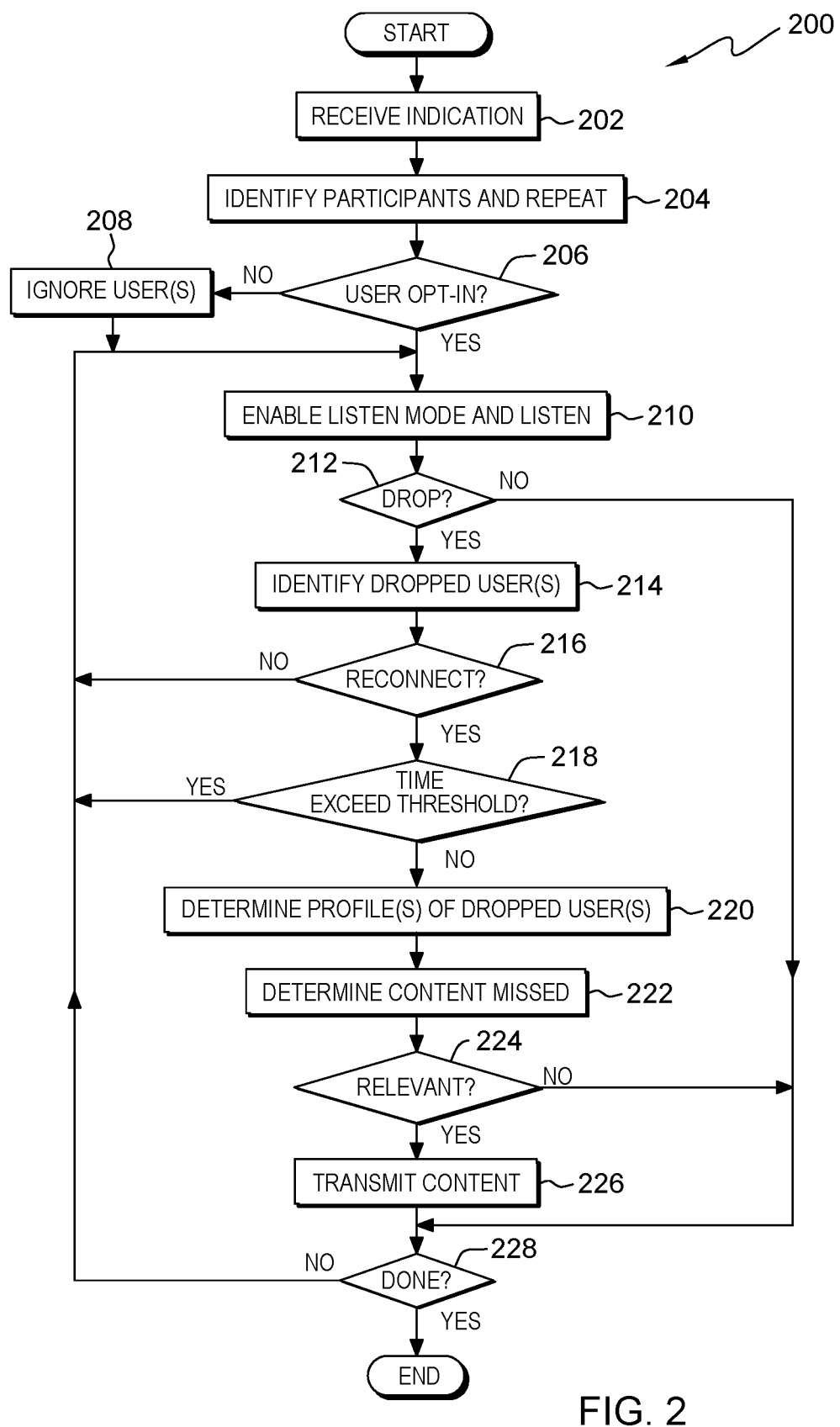
FIG. 2 is a flowchart depicting operational steps of a program for providing missed content to a user unintentionally disconnected from an e-con, on a computing device within the computing environment of FIG. 1, in accordance with an embodiment of the present invention.

FIG. 2 is a flowchart of workflow 200 depicting operational steps for providing missed content to a user unintentionally disconnected from an electronic conference. In one embodiment, the method of workflow 200 is performed by content extraction program 139. In an alternative embodiment, the method of workflow 200 is performed by any other program in computing environment 100 working with content extraction program 139. In an embodiment, content extraction program 139 is invoked by a user of client device 120-N initiating e-con app 122-N. In another embodiment, a user of server device 130 invokes workflow 200 upon accessing content extraction program 139. In yet another embodiment, workflow 200 is dynamically invoked based upon a calendar entry of a user associated with an e-con.

In an embodiment, content extraction program 139 receives an indication (step 202). In other words, content extraction program 139 receives an indication from at least one user (i.e., electronic conference, or e-con, participant) of an e-con. According to one embodiment, the e-con is being initiated by the at least one user. According to another embodiment, the e-con is currently on-going (i.e., has already started). The indication received by content extraction program 139 can be from a user, a program, or any means of providing an indication known in the art. In an embodiment, content extraction program 139 receives an indication of an on-going e-con over network 110 from e-con app 122-N on client device 120-N. For example, Bill is late to join a department meeting, which is being held as an e-con, with his four other department members. A program on a server owned and operated by "XYX" company receives an indication that Bill has joined the e-con.

According to an embodiment of the present invention, content extraction program 139 identifies participants and repeats (step 204). In other words, content extraction program 139 (i) identifies the participants of the e-con and (ii) repeats the identification process on a pre-defined frequency (e.g., every five minutes, every ten minutes, etc.). In an embodiment, content extraction program 139 uses voice recognition to identify the participants of the e-con. In another embodiment, content extraction program 139 uses a calendar entry of at least one participant of the e-con to identify the other participants. In yet another embodiment, content extraction program 139 uses any identification technique known in the art to identify the participants. The pre-defined frequency of time is defined by at least one of content extraction program 139, e-con app 122-N, and a participant of the e-con. According to an embodiment, content extraction program 139 identifies the participants of the on-going e-con using voice recognition. For example, the program on the "XYX" server identifies the other four participants of the e-con that Bill has joined; the four participants are Joe (responsible for benefits), Eric (responsible for education), Sue (responsible for safety), and Barry (the manager of the department). Bill is responsible for the finances of the department.

In an embodiment, content extraction program 139 determines user opt-in (decision step 206). In other words, content extraction program 139 determines whether each of the identified participants of the e-con have granted permission (i.e., opted-in) to being monitored by content extraction program 139 (i.e., a first subset of the identified participants will have opted-in and a second subset will not have opted-in). In an embodiment (decision step 206, NO branch), content extraction program 139 determines that a first group of participants has not opted-in; therefore, content extraction program 139 proceeds to step 208 to ignore user(s) (e.g., the first group of participants). In the embodiment (decision step 206, YES branch), content extraction program 139 determines that a second group of participants has opted-in; therefore, content extraction program 139 proceeds to step 210 to enable listen mode and listen.

According to an embodiment of the present invention, content extraction program 139 may utilize various accessible data sources that may include personal data, content, or information the e-con participants wish not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Opting-in to use content extraction program 139 enables the authorized and secure processing of personal data. Content extraction program 139 provides informed consent, with notice of the collection of personal data, allowing the one or more users to opt-in or opt-out of processing personal data. Consent can take several forms. Opt-in consent can impose on a user to take an affirmative action before personal data is processed. Alternatively, opt-out consent can impose on the user to take an affirmative action to prevent the processing of personal data before personal data is processed. Content extraction program 139 provides information regarding personal data and the nature (e.g., type, scope, purpose, duration, etc.) of the processing. Content extraction program 139 provides the one or more users with copies of stored personal data, if any personal data is stored. Further, content extraction program 139 allows for the correction or completion of incorrect or incomplete personal data and also allows for the immediate deletion of personal data. According to an embodiment, content extraction program 139 on server device 130 determines that at least one user of client device 120-N has opted-in to content extraction program 139. For example, a program on the "XYX" server receives an opt-in from Bill and Barry but does not receive opt-ins from the other department members (i.e., from Joe, Eric, or Sue).

According to an embodiment, content extraction program 139 ignores user(s) (step 208). In other words, responsive to determining that a first group of participants of the e-con have not opted-in (i.e., have not granted permission to content extraction program 139), content extraction program 139 ignores the first group of participants. In an embodiment, content extraction program 139 ignores the first group of participants such that if any of the first group is disconnected (or drops) unintentionally from the on-going e-con, content extraction program 139 will take no action and will not provide missed content to said participants. However, should a user in the first group of participants opt-in during the on-going e-con, content extraction program 139 will recognize the opt-in and remove said user from the group of participants being ignored. According to an embodiment, content extraction program 139 ignores the first group of participants that were determined to not have opt-ed in. For example, the program on the "XYX" server ignores e-con participants Joe, Eric, and Sue from a perspective of each being connected to the e-con (i.e., if one or more of Joe, Eric, and Sue are unintentionally disconnected from the e-con, the program on the "XYX" server would ignore the disconnection).

In an embodiment, content extraction program 139 enables listen mode and listens (step 210). In other words, in response to determining at least one participant of the e-con has opted-in, content extraction program 139 enables a listen mode for the on-going e-con and begins "listening" to said e-con. According to an embodiment, by "listening", content extraction program 139 uses speech-to-text application programming interfaces (APIs) known in the art to capture audio and video which produces transcripts of spoken audio and video.

Further, content extraction program 139 uses natural language understanding (NLU) techniques, part of natural language processing (NLP), to extract metadata (e.g., keywords, concepts, categories, sentiment, emotion, etc.) from the produced transcript, thus correlating content from the e-con to a specific participant. Thus, content extraction program 139 can determine the important portions of the e-con. In an embodiment, content extraction program 139 enables a listen mode and begins listening to the on-going e-con being held over network 110 between users of e-con app 122-N included client device 120-N. For example, the program on the "XYX" server begins listening to the on-going e-con between Bill, Joe, Eric, Sue, and Barry.

According to an embodiment of the present invention, content extraction program 139 determines whether one or more opted-in users have dropped from the e-con (decision step 212). In other words, content extraction program 139 determines whether one or more users unintentionally disconnect (i.e., drop) from the e-con. An intentional disconnection occurs when a user states during the e-con that said user intends to disconnect or when said user selects a "leave the meeting" option available in the e-con platform being used during the e-con. Any other type of disconnection is assumed by content extraction program 139 to be unintentional. Examples of an unintentional disconnection include, but are not limited to, disconnecting due to a low signal strength, disconnection because a device loses power (e.g., a battery runs out or an electrical supply shuts off), or disconnecting because of a hardware failure. In an embodiment (decision step 212, NO branch), content extraction program 139 determines that one or more users have not dropped, or unintentionally disconnected, from the e-con; therefore, content extraction program 139 proceeds to step 228 to determine if the e-con is done (i.e., completed). In the embodiment (decision step 212, YES branch), content extraction program 139 determines that one or more users have dropped from the e-con; therefore, content extraction program 139 proceeds to step 214 to identify the dropped one or more users.

In an embodiment, content extraction program 139 identifies dropped user(s) (step 214). In other words, responsive to determining that one or more opted-in users have unintentionally disconnected from the e-con, content extraction program 139 identifies the one or more dropped users. According to an embodiment, content extraction program 139 identifies the one or more dropped users by comparing the previously identified participants (e.g., by name, e-mail address, or any other form of identification) to the current participants who remain connected to the e-con. In another embodiment, content extraction program 139 identifies the one or more dropped users by monitoring the stateful connection maintained by the specific e-con application while the e-con is in progress. In an embodiment, content extraction program 139 identifies the user(s) associated with client device 120-N who were unintentionally dropped from the e-con amongst the multiple users of e-con app 122-N. For example, the program on the "XYX" server identifies that Bill has unintentionally dropped from the department meeting.

According to an embodiment of the present invention, content extraction program 139 determines reconnection (decision step 216). In other words, content extraction program 139 determines whether a dropped user has reconnected to the e-con. In an embodiment, content extraction program 139 determines a reconnection based on an IP address comparison between the connections prior to the drop to the connections after identifying the one or more dropped users. In an embodiment (decision step 216, NO branch), content extraction program 139 determines that the identified one or more users, unintentionally dropped from the e-con, have not reconnected to said e-con; therefore, content extraction program 139 returns to step 210 to continue listening to said e-con. In the embodiment (decision step 216, YES branch), content extraction program 139 determines that at least one user of the identified one or more users, who unintentionally dropped from the e-con, have reconnected to the e-con; therefore, content extraction program 139 proceeds to decision step 218 to determine the elapsed time.

In an embodiment, content extraction program 139 determines whether the time exceeds a threshold (decision step 218). In other words, responsive to determining that at least one user of the identified one or more users, who unintentionally dropped from the e-con, has reconnected to the e-con, content extraction program 139 determines whether the elapsed time taken to reconnect to the e-con exceeds a threshold. According to an embodiment, the elapsed time threshold is determined by one or more of a user of e-con app 122-N on client device 120-N, an administrator of client device 120-N and/or server device 130 (e.g., an administrator of the server hosting the e-con), and content extraction program 139. Examples of the elapsed time threshold include, but are not limited to five minutes, ten minutes, and fifteen minutes. In an embodiment (decision step 218, YES branch), content extraction program 139 determines that an elapsed time threshold has been exceeded; therefore, content extraction program 139 returns to step 210 to continue listening to the e-con. In the embodiment (decision step 218, NO branch), content extraction program 139 determines that an elapsed time threshold has not been exceeded; therefore, content extraction program 139 proceeds to step 220 to determine a user profile.

According to an embodiment of the present invention, content extraction program 139 determines a profile of the dropped user (step 220). In other words, responsive to determining that at least one user of the one or more users, who unintentionally dropped from the e-con, (i) has reconnected to the e-con and (ii) has not exceeded a time threshold for reconnecting to said e-con, content extraction program 139 determines the profile of the at least one user. In an embodiment, content extraction program 139 retrieves metadata associated with the at least one user based on the granted permission (i.e., the opt-in) of the at least one user. Sources for the metadata include, but are not limited to, company or business records (e.g., job title, role/responsibilities, skills, expertise, communications, etc.), education records, and social media content associated with the at least one user. Content extraction program 139 determines the profile of the at least one user by analyzing the retrieved metadata using NLP, NLU, and other previously described techniques which are known in the art. According to an embodiment, content extraction program 139 determines a user profile associated with the at least one user of client device 120-N who unintentionally dropped from the e-con but reconnected within an elapsed time threshold by retrieving metadata stored to user information 136 in database 134 on server device 130 associated with the at least one user. For example, the program on the "XYX" server determines a profile associated with Bill; the profile identifies Bill's primary responsibility as department finances.

In an embodiment, content extraction program 139 determines content missed (step 222). In other words, content extraction program 139 determines the content missed by the at least one user during the time said user unintentionally dropped from the e-con. According to an embodiment, content extraction program 139 identifies the time period between when the at least one user unintentionally dropped from the e-con and when said user reconnected to the e-con. Once the time period is identified, content extraction program 139 determines the e-con content discussed in the time period based on the previously discussed techniques used by content extraction program 139 while listening to the e-con. In an embodiment, content extraction program 139 retrieves discussed e-con content stored to conference content 138 in database 134 on server device 130 and determines the missed content. For example, the program on the "XYX" server determines that the content missed by Bill that was presented in the department meeting was (i) a discussion of a sporting event and (ii) a discussion of purchasing a second computer monitor for everyone in the department.

According to an embodiment, content extraction program 139 determines whether the missed content is relevant (decision step 224). In other words, responsive to determining a profile associated with the at least one user and the e-con content missed by the at least one user, content extraction program 139 determines whether the missed content is relevant (i.e., applicable) for the user. In an embodiment, content extraction program 139 compares the content missed by the at least one user to the determined profile of the at least one user to determine whether said missed content is relevant or applicable to the user. In the embodiment, a user can select one of three preferences—(i) a user may input to content extraction program 139 that only relevant content in the e-con should be captured for the user (i.e., content that is directly related to the user and the user's responsibilities), (ii) a user may input to content extraction program 139 any number of topics of interest that will be discussed during the e-con that should be captured for the user, and (iii) a user may input to content extraction program 139 that all content in the e-con is relevant and should be captured for the user. According to an embodiment (decision step 224, NO branch), content extraction program 139 determines that the missed content is not relevant for the at least one user based on the preference of the user; therefore, content extraction program 139 proceeds to step 228 to determine whether the e-con is finished. According to the embodiment (decision step 224, YES branch), content extraction program 139 determines that the missed content is relevant for the at least one user based on the preference of the user; therefore, content extraction program 139 proceeds to step 226 to transmit the missed content.

In an embodiment, content extraction program 139 transmits content (step 226). In other words, responsive to determining that the missed content is relevant to the at least one user, content extraction program 139 transmits the missed content to the at least one user. According to an embodiment of the present invention, based on a preference of the at least one user, content extraction program 139 transmits at least one of (i) the exact missed content or (ii) a summary of the missed content to a computing device of the at least one user. The missed content is transmitted to the computing device of the at least one user via any technology known in the art. Some examples include via an e-mail, via a text message, and via an audio message. In an embodiment, content extraction program 139 on server device 130 transmits over network 110 the missed content from the e-con to a user of client device 120-N. For example, the program on the "XYX" server transmits the discussion of purchasing a second computer monitor for everyone in the department to Bill; however, because Bill's profile indicates that he has little interest in sports, the program does not transmit the discussion pertaining to the sporting event.

According to an embodiment, content extraction program 139 determines whether the e-con is done (decision step 228). In other words, content extraction program 139 determines if the e-con is still on-going between at least two participants or if the e-con has finished. In an embodiment (decision step 228, NO branch), content extraction program 139 determines that the e-con is not done; therefore, content extraction program 139 returns to step 210 to continue listening. In the embodiment (decision step 228, YES branch), content extraction program 139 determines that the e-con is done; therefore, content extraction program 139 ends.

Figure 3:
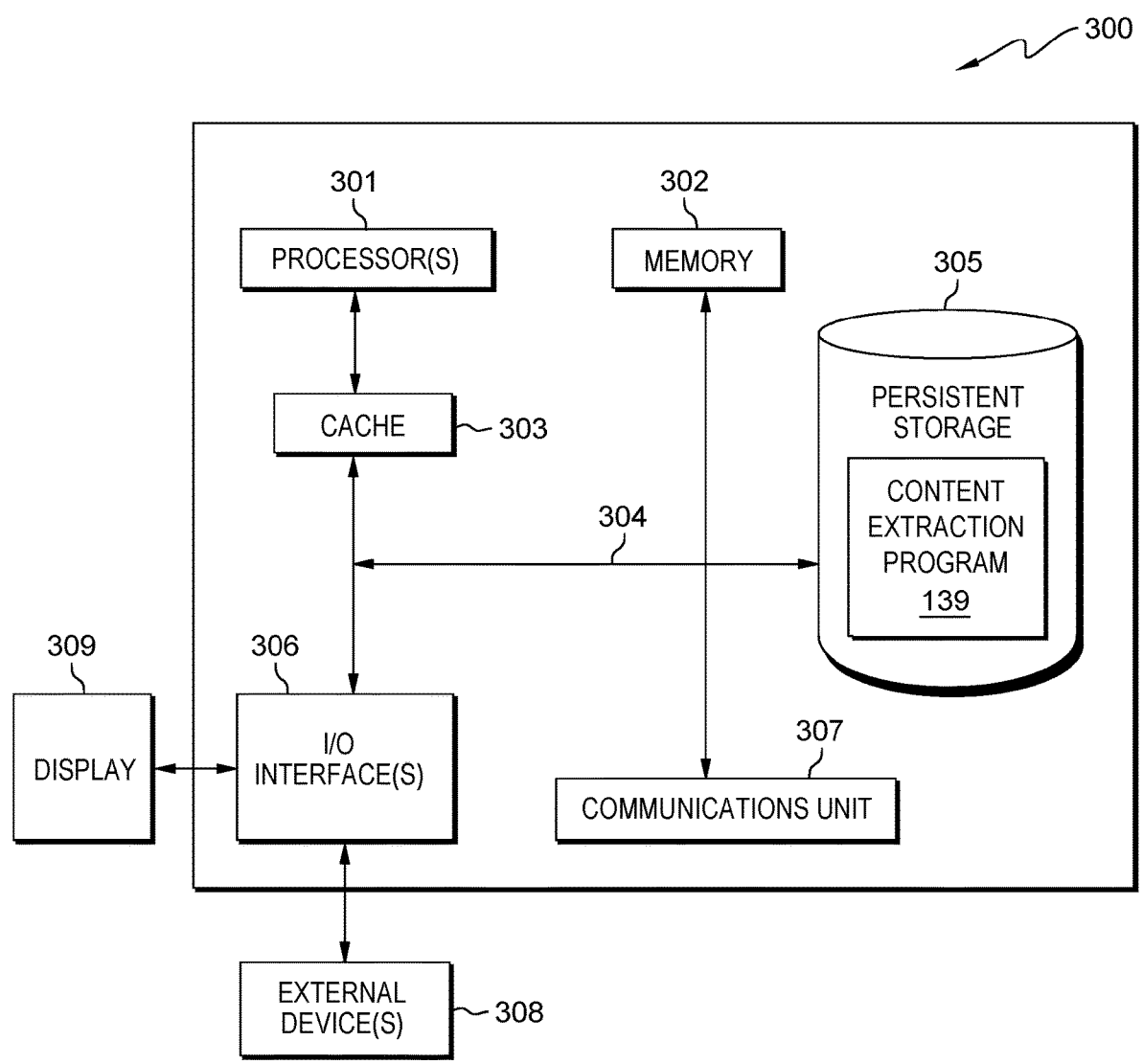
FIG. 3 depicts a block diagram of components of a computing device executing a content extraction program within the computing environment of FIG. 1, in accordance with an embodiment of the present invention.

FIG. 3 depicts computer system 300, which is an example of a system that includes content extraction program 139. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. PO interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   determining, by one or more computer processors, a profile associated with a user that has unintentionally disconnected from an electronic conference;
   determining, by one or more computer processors, content missed by the user;
   determining, by one or more computer processors, whether the content missed by the user is relevant to the user based on the determined profile associated with the user and a first indicated preference of the user, wherein the first indicated preference of the user includes at least one of capturing content related to a responsibility of the user, capturing content related to a topic of interest of the user, and capturing all of the content missed by the user; and responsive to determining that the content missed by the user is relevant to the user based on the determined profile associated with the user and the first indicated preference of the user, transmitting, by one or more computer processors, the content missed by the user to a computing device of the user based on a second indicated preference of the user, wherein the second indicated preference of the user includes transmitting at least one of an exact missed content and a summary of the content missed by the user.

2. The method of claim 1, further comprising:
prior to determining the profile associated with the user that has unintentionally disconnected from the electronic conference, identifying, by one or more computer processors, the user that has unintentionally disconnected from the electronic conference;
determining, by one or more computer processors, whether the identified user has reconnected to the electronic conference;
responsive to determining that the identified user has reconnected to the electronic conference, determining, by one or more computer processors, whether a time to reconnect to the electronic conference has exceeded a threshold; and
responsive to determining that the time to reconnect to the electronic conference has exceeded the threshold, monitoring, by one or more computer processors, the electronic conference.

3. The method of claim 2, wherein:
the time to reconnect threshold is an elapsed time which passes before the user reconnects to the electronic conference; and
the time to reconnect threshold is determined by at least one of a user of an application of the electronic conference, an administrator of a server hosting the electronic conference, and a program.

4. The method of claim 1, further comprising:
receiving, by one or more computer processors, an indication of the electronic conference;
identifying, by one or more computer processor, a set of users participating in the electronic conference;
determining, by one or more computer processors, whether each user in the set of users has opted-in to being monitored; and
responsive to determining that a first subset of users included in the set of users has opted-in to being monitored, enabling, by one or more computer processors, a listen mode to monitor the electronic conference.

5. The method of claim 4, further comprising:
responsive to determining that a second subset of users included in the set of users has not opted-in to being monitored, ignoring, by one or more computer processors, each user in the second subset of users.

6. The method of claim 4, wherein:
the enabled listen mode uses speech-to-text application programming interfaces to capture audio and video content of the electronic conference to produce a transcript of the audio and video content; and
the enabled listen mode uses natural language understanding to extract metadata such as keywords, concepts, categories, sentiment, and emotion from the produced transcript to determine content relevant to the user.

7. The method of claim 1, wherein the user is unintentionally disconnected from the electronic conference when the user is disconnected without stating an intention to disconnect or without selecting an option to leave the electronic conference available in the electronic conference.

8. The method of claim 1, wherein determining the profile associated with the user that has unintentionally disconnected from the electronic conference further comprises:
retrieving, by one or more computer processors, metadata associated with the user based on an opt-in permission of the user, wherein sources of the metadata include company records, business records, education records, and social media content; and
determining, by one or more computer processors, the profile associated with the user by analyzing the retrieved metadata, wherein the analysis includes natural language processing and natural language understanding techniques.

9. A computer program product, the computer program product comprising:
one or more computer readable storage media; and
program instructions stored on the one or more computer readable storage media, the program instructions comprising:
program instructions to determine a profile associated with a user that has unintentionally disconnected from an electronic conference;
program instructions to determine content missed by the user;
program instructions to determine whether the content missed by the user is relevant to the user based on the determined profile associated with the user and a first indicated preference of the user, wherein the first indicated preference of the user includes at least one of capturing content related to a responsibility of the user, capturing content related to a topic of interest of the user, and capturing all of the content missed by the user; and
responsive to determining that the content missed by the user is relevant to the user based on the determined profile associated with the user and the first indicated preference of the user, program instructions to transmit the content missed by the user to a computing device of the user based on a second indicated preference of the user, wherein the second indicated preference of the user includes transmitting at least one of an exact missed content and a summary of the content missed by the user.

10. The computer program product of claim 9, further comprising program instructions stored on the one or more computer readable storage media, to:
prior to determining the profile associated with the user that has unintentionally disconnected from the electronic conference, identify the user that has unintentionally disconnected from the electronic conference;
determine whether the identified user has reconnected to the electronic conference;
responsive to determining that the identified user has reconnected to the electronic conference, determine whether a time to reconnect to the electronic conference has exceeded a threshold; and
responsive to determining that the time to reconnect to the electronic conference has exceeded the threshold, monitor the electronic conference.

11. The computer program product of claim 10, wherein:
the time to reconnect threshold is an elapsed time which passes before the user reconnects to the electronic conference; and
the time to reconnect threshold is determined by at least one of a user of an application of the electronic conference, an administrator of a server hosting the electronic conference, and a program.

12. The computer program product of claim 9, further comprising program instructions stored on the one or more computer readable storage media, to:
receive an indication of the electronic conference;
identify a set of users participating in the electronic conference;
determine whether each user in the set of users has opted-in to being monitored; and
responsive to determining that a first subset of users included in the set of users has opted-in to being monitored, enable a listen mode to monitor the electronic conference.

13. The computer program product of claim 12, further comprising program instructions stored on the one or more computer readable storage media, to:
responsive to determining that a second subset of users included in the set of users has not opted-in to being monitored, ignore each user in the second subset of users.

14. The computer program product of claim 12, wherein:
the enabled listen mode uses speech-to-text application programming interfaces to capture audio and video content of the electronic conference to produce a transcript of the audio and video content; and
the enabled listen mode uses natural language understanding to extract metadata such as keywords, concepts, categories, sentiment, and emotion from the produced transcript to determine content relevant to the user.

15. The computer program product of claim 9, wherein the user is unintentionally disconnected from the electronic conference when the user is disconnected without stating an intention to disconnect or without selecting an option to leave the electronic conference available in the electronic conference.

16. The computer program product of claim 9, wherein the program instructions to determine the profile associated with the user that has unintentionally disconnected from the electronic conference further comprises:
program instructions to retrieve metadata associated with the user based on an opt-in permission of the user, wherein sources of the metadata include company records, business records, education records, and social media content; and
program instructions to determine the profile associated with the user by analyzing the retrieved metadata, wherein the analysis includes natural language processing and natural language understanding techniques.

17. A computer system, the computer system comprising:
one or more computer processors;
one or more computer readable storage media; and
program instructions stored on the one or more computer readable storage media for execution by at least one of the one or more computer processors, the program instructions comprising:
program instructions to determine a profile associated with a user that has unintentionally disconnected from an electronic conference;
program instructions to determine content missed by the user;
program instructions to determine whether the content missed by the user is relevant to the user based on the determined profile associated with the user and a first indicated preference of the user, wherein the first indicated preference of the user includes at least one of capturing content related to a responsibility of the user, capturing content related to a topic of interest of the user, and capturing all of the content missed by the user; and
responsive to determining that the content missed by the user is relevant to the user based on the determined profile associated with the user and the first indicated preference of the user, program instructions to transmit the content missed by the user to a computing device of the user based on a second indicated preference of the user, wherein the second indicated preference of the user includes transmitting at least one of an exact missed content and a summary of the content missed by the user.

18. The computer system of claim 17, further comprising program instructions stored on the one or more computer readable storage media for execution by at least one of the one or more computer processors, to:
prior to determining the profile associated with the user that has unintentionally disconnected from the electronic conference, identify the user that has unintentionally disconnected from the electronic conference;
determine whether the identified user has reconnected to the electronic conference;
responsive to determining that the identified user has reconnected to the electronic conference, determine whether a time to reconnect to the electronic conference has exceeded a threshold; and
responsive to determining that the time to reconnect to the electronic conference has exceeded the threshold, monitor the electronic conference.

* * * * *